United States Patent Office 3,121,667
Patented Feb. 18, 1964

3,121,667
PREPARATION OF 6-AMINOPENICILLANIC ACID
Thomas Boyne Platt, Neshanic Station, and Rudy Joseph Wodzinski, Kendall Park, N.J., assignors to Olin Mathieson Chemical Corporation, New York, N.Y., a corporation of Virginia
No Drawing. Filed Jan. 24, 1962, Ser. No. 168,501
10 Claims. (Cl. 195—36)

This invention relates to an improved process for preparing 6-aminopenicillanic acid and more particularly to an improved process for preparing the compound by enzymatic hydrolysis of penicillins.

6-aminopenicillanic acid is a known compound of unique utility as an intermediate in the preparation of penicillins. The conversion to penicillins can be simply effected by treating 6-aminopenicillanic acid with the desired acylating agent in the presence of a catalyst. Unfortunately, it is difficult to prepare 6-aminopenicillanic acid directly by fermentation so that resort has been made to the preparation of the compound by hydrolysis of a penicillin.

It has now been found that enzymes of the following species of microorganisms: *Streptomyces griseus, Streptomyces azureus, Streptomyces fradiae, Streptomyces olivaceus,* and *Bacterium cyclo-oxydans,* will effect the desired hydrolysis of all known penicillins to 6-aminopenicillanic acid. In contrast, many of the enzyme systems previously known would effect such hydrolysis only when certain penicillins, such as the more easily hydrolyzed phenoxymethyl penicillin (penicillin V) and α-phenoxyethyl penicillin, were used and were ineffective when other more resistant penicillins, such as benzyl penicillin (penicillin G), were employed.

Thus, by the use of the enzymes of the species of microorganisms of this invention, a process for preparing 6-aminopenicillanic acid from any known penicillin is made possible. In its broadest aspects, therefore, the process of this invention comprises subjecting a penicillin to the action of enzymes of a microorganism selected from the group consisting of *Streptomyces griseus, Streptomyces azureus, Streptomyces fradiae, Streptomyces olivaceus* and *Bacterium cyclo-oxydans,* whereby 6-aminopenicillanic acid is obtained.

Any penicillin may be employed as the precursor in the preparation of 6-aminopenicillanic acid in accordance with the process of this invention. Such penicillins include penicillin G, penicillin V and α-phenoxyethyl penicillin.

The penicillin is contacted with the enzymes of one of the species of microorganisms mentioned hereinbefore. The enzymes can be those in the cells of the desired microorganism and/or the enzymes released into the medium from the cells. The enzyme activity is obtained by growing the desired microorganism in a nutrient medium for a sufficient time. On separating the cells from the medium, as by filtration or centrifugation, after approximately three days growth, the enzyme activity is found largely with the cells. When incubation is continued for more than approximately three days, a major portion of the enzyme activity is found in the medium.

In accordance with the preferred method of this invention, the desired microorganism is grown in contact with (in or on) a suitable nutrient medium in the presence of oxygen (air). A suitable nutrient medium essentially comprises a source of nitrogenous factors and an assimilable source of carbon and energy. The latter may be a carbohydrate (such as sucrose, molasses, glucose, maltose, starch or dextrin). The source of nitrogenous factors may be organic (e.g., soybean meal, cornsteep liquor, meat extract, distillers solubles, peptones and/or yeast extract) or synthetic (i.e., composed of simple, synthesizable organic and inorganic compounds such as ammonium salts, alkali nitrates, amino acids or urea). The microorganism is grown at a suitable temperature, such as from about 20° C. to about 35° C. for a suitable period of time, preferably about 8 hours to about 8 days, after which the cells are separated from the medium by filtration or centrifugation.

The separated cells are then suspended in aqueous buffer and the penicillin substrate is added. The penicillin is preferably added in the form of a water-soluble salt, such as an alkali metal salt (e.g., potassium and sodium salt). The hydrolysis can be carried out at any normal temperature and pH. However, to assure that the enzyme and penicillin are not destroyed, the reaction is preferably conducted at a temperature less than about 55° C., and a pH in the range of about 6 to about 10 (preferably about 7.5 to about 9.2).

The 6-aminopenicillanic acid formed can then be recovered in the usual manner, as by absorption on an ion-exchange resin [e.g., IR–120 ($H^+$)], elution with a base (e.g., ammonium hydroxide at pH 7), concentration of the eluate in vacuo and adjustment of pH to 4.4 to obtain the crystalline product; or it may be reacted in situ with a desired acylating agent to give a penicillin different from that from which the 6-aminopenicillanic acid was initially prepared.

The following examples illustrate the invention (all temperatures being in centigrade):

EXAMPLE 1

(a) Fermentation

One vial of lypholyzed *Streptomyces griseus* (No. 4 in the Waksman Collection, Institute of Microbiology, Rutgers University, New Brunswick, New Jersey) mycelium is used to inoculate a 100 ml. portion of the following medium in an Erlenmeyer flask:

| | G. |
|---|---|
| Extracted soybean flour | 50 |
| Cornsteep liquor | 8 |
| NaCl | 5 |

Tap water to 1 liter.

pH to 7.1; autoclaved at 121° for 20–30 minutes.

The inoculated flask is incubated at 25° with rotary shaking at 280 cycles per minute in a radius of about 2 inches. After three days, a 10% (vol./vol.) transfer is made into 100 ml. of the same medium in a 500 ml. Erlenmeyer flask. The inoculated flask is incubated for 5 days as described above.

(b) Recovery of the Enzymes

The five day culture described in step *a* is centrifuged until the cells are completely separated from the liquid portion. The cells are then resuspended in 100 ml. of M/5 borate buffer, pH 8.5, and again recovered by centrifugation.

(c) Hydrolysis of Pencillin G to 6-Aminopenicillanic Acid (1) *Hydrolysis by the cells.*—The cells from step *b* are resuspended in M/5 borate buffer, pH 8.5, to give a cell concentration ten times that of the original five day culture. Benzyl penicillin is added as a 25% solution in M/5 borate buffer, pH 8.5, to give a final concentration of 50 mg./ml. of benzyl pencillin. The resulting mixture is agitated gently and incubated for four hours at 45°. Paper chromatographic analysis reveals the presence of 6-aminopenicillanic acid and residual substrate. The hydroxylamine assay of 6-aminopenicillanic acid (after removal of residual substrate by solvent extraction at pH 2.5), reveals about 400 micrograms/ml. of 6-aminopenicillanic acid in the reaction mixture.

(2) *Hydrolysis by the supernatant.*—The cell free supernatant from the culture, as described in step *b*, is used as the source of enzymes. Benzyl penicillin is dissolved in borate buffer at pH 8.5 and added directly to the supernatant so that the final concentration of borate is M/5 and benyl penicillin is 50 mg./ml. The enzyme reaction mixture is incubated at 45° for four hours. Presence of 6-aminopenicillanic acid is determined as in step *c*(1).

EXAMPLE 2

Following the procedure of Example 1, but substituting *Streptomyces azureus* (No. 3705 in the Waksman Collection, Institute of Microbiology, Rutgers University, New Brunswick, New Jersey) for *Streptomyces griseus* is obtained as enzyme which hydrolyzes benzyl penicillin to 6-aminopenicillanic acid.

EXAMPLE 3

Following the procedure of Example 1, but substituting *Streptomyces fradiae* (No. 3535 in the Waksman Collection, Institute of Microbiology, Rutgers University, New Brunswick, New Jersey) for *Streptomyces griseus* there is obtained as enzyme which hydrolyzes benzyl penicillin to cillin to 6-aminopenicillanic acid.

EXAMPLE 4

Following the procedure of Example 1, but substituting *Streptomyces olivaceus* (No. 3688 in the Waksman Collection, Institute of Microbiology, Rutgers University, New Brunswick, New Jersey) for the *Streptomyces griseus* there is obtained an enzyme which will hydrolyze benzyl pennicillin to 6-aminopenicillanic acid.

EXAMPLE 5

Following the procedures of Examples 1, 2, 3 and 4, but substituting α-phenoxyethyl or phenoxymethyl penicillin for the benzyl pencillin, 6-aminopenicillanic acid is obtained.

EXAMPLE 6

(*a*) *Fermentation*

Surface growth from a three day old agar slant (beef extract, 1.5 g.; yeast extract, 3 g.; peptone, 6 g.; dextrose, 1 g.; agar, 20 g., distilled water to 1 liter) culture of *Bacterium cyclo-oxydans* (ATCC No. 12,673) is suspended in 5 ml. of sterile physiological saline solution. Two ml. portions of the suspension are used to inoculate 50 ml. portions of Difco Brain Heart Infusion Broth in 500 ml. Erlenmeyer flasks. The inoculated flasks are incubated at 25° with rotary shaking at 280 cycles per minute in a radius of about 2 inches for 48 hours.

(*b*) *Recovery of the Enzyme*

The two day culture described in step *a* is centrifuged until the cells are completely separated from the liquid portion. The cells are resuspended in M/5 carbonate-bicarbonate buffer at pH 8.0 and again recovered by centrifugation.

(*c*) *Hydrolysis of Penicillin G to 6-Aminopenicillanic Acid*

(1) *Hydrolysis by the cells.*—The cells from step *b* are resuspended in M/5 carbonate-bicarbonate buffer at pH 8.0 to give a cell concentration of about 250–300 micrograms/ml. dry weight. Benzyl penicillin is added as a 25% solution in M/5 carbonate-bicarbonate buffer, pH 8.0, to give a final concentration of 50 mg./ml. of benzyl penicillin. The resulting mixture is agitated gently and incubated for five hours at 45°. Presence of 6-aminopenicillanic acid is determined as in step *c* of Example 1.

(2) *Hydrolysis by the supernatant.*—The cell free supernatant from the culture, as described in step *b*, is used as the source of enzyme. Benzyl penicillin is dissolved in carbonate-bicarbonate buffer, pH 8.0, and added directly to the supernatant so that the final concentration of carbonate-bicarbonate is M/5 and benzyl penicillin is 50 mg./ml. The enzyme reaction mixture is incubated at 45° for five hours. Presence of 6-aminopenicillanic acid is determined as in step *c* of Example 1.

EXAMPLE 7

Following the procedure of Example 6, but substituting α-phenoxyethyl penicillin for the benzyl penicillin, 6-aminopenicillanic acid is obtained.

This invention may be variously otherwise embodied within the scope of the appended claims.

What is claimed is:

1. A process for preparing 6-aminopenicillanic acid, which comprises subjecting a penicillin to the action of enzymes of a microorganism selected from the group consisting of *Streptomyces griseus, Streptomyces azureus, Streptomyces fradiae, Streptomyces olivaceus* and *Bacterium cyclo-oxydans*, whereby 6-aminopenicillanic acid is obtained.

2. The process of claim 1 wherein the microorganism is *Streptomyces griseus*.

3. The process of claim 1 wherein the microorganism is *Streptomyces azureus*.

4. The process of claim 1 wherein the microorganism is *Streptomyces fradiae*.

5. The process of claim 1 wherein the microorganism is *Streptomyces olivaceus*.

6. The process of claim 1 wherein the microorganism is *Bacterium cyclo-oxydans*.

7. The process of claim 1 wherein the penicillin is penicillin G.

8. The process of claim 1 wherein the penicillin is penicillin V.

9. The process of claim 1 wherein the penicillin is α-phenoxyethyl penicillin.

10. A process for preparing 6-aminopenicillanic acid, which comprises subjecting a penicillin to the action of enzymes of *Streptomyces griseus* whereby 6-aminopenicillanic acid is obtained.

References Cited in the file of this patent

UNITED STATES PATENTS

OTHER REFERENCES 3,014,845    Rolinson et al. _____ Dec. 26, 1961

Huang et al.: J. Am. Chem. Soc., vol. 82, pp. 3790–3791, July 20, 1960. (Copy in Patent Office Sci. Lib.)